United States Patent [19]

Swartzendruber

[11] Patent Number: 4,496,005
[45] Date of Patent: Jan. 29, 1985

[54] CONTINUOUS GAUGE WHEEL ARM ADJUSTMENT DEVICE WITH SCISSORS ACTION LOCKING

[75] Inventor: James A. Swartzendruber, Bettendorf, Iowa

[73] Assignee: Deere & Company, Moline, Ill.

[21] Appl. No.: 513,534

[22] Filed: Jul. 13, 1983

[51] Int. Cl.³ .............................................. A01B 15/00
[52] U.S. Cl. ...................................... 172/395; 280/43; 403/98
[58] Field of Search ............... 172/395, 416, 675, 212, 172/270, 366; 280/43; 403/92, 93, 98

[56] References Cited

U.S. PATENT DOCUMENTS

| | | |
|---|---|---|
| 243,126 | 6/1881 | Hague .............................. 172/395 X |
| 254,932 | 3/1882 | Davidson ............................ 172/366 |
| 282,852 | 8/1883 | Davidson ............................ 172/270 |
| 1,667,866 | 5/1928 | Olson . |
| 1,787,127 | 12/1930 | Strandlund . |
| 1,793,353 | 2/1931 | Benson .................................. 280/43 |
| 3,625,293 | 12/1971 | Nelson ................................ 172/395 |
| 3,755,998 | 9/1973 | Hoffmeyer ............................ 280/43 |
| 4,182,099 | 1/1980 | Davis .................................. 56/16.4 |

Primary Examiner—Richard J. Johnson

[57] ABSTRACT

A gauge wheel arm pivotally connected to an implement frame carries a first slotted plate, and a second slotted plate is fixed to the frame with the slots of the respective plates overlapping to receive a single bolt at the area of overlap. The slots, which provide for continuous adjustment of the arm, are angled with respect to each other to provide a scissors- or ramp-type action on the bolt which positively fixes the arm relative to the frame.

11 Claims, 2 Drawing Figures

CONTINUOUS GAUGE WHEEL ARM ADJUSTMENT DEVICE WITH SCISSORS ACTION LOCKING

BACKGROUND OF THE INVENTION

The present invention relates generally to gauge wheels for agricultural implements, and more specifically to a gauge wheel arm adjustment device for providing continuous arm adjustment with positive locking of the arm in any desired position.

Manually adjustable gauge wheels are commonly available for agricultural implements to maintain or assist in maintaining a preselected tillage depth. In addition, the gauge wheel may be used to support the implement during storage or times when the implement is disconnected from the tractor. For example, a gauge wheel is available as an attachment for tractor-mounted integral plows to maintain proper depth in adverse plowing conditions, and the wheel is lowered as a support when the plow is detached from the hitch.

Most manually adjustable gauge wheels, whether utilized on a plow or on another type of agricultural equipment, are only adjustable in increments. Some include apertured bracket and arm arrangement with the arm secured in one of a plurality of positions by a pin passing through the apertures. Although this arrangement positively fixes the arm with respect to the implement frame even under heavy loading, there is no way to fine tune the depth adjustment. Other arrangements commonly utilized with plow gauge wheels or the like include serrations or notches along slots and in the brackets to positively clamp the gauge wheel arm, but these are relatively bulky and expensive and do not permit continuous adjustment.

It is therefore an object of the present invention to provide an improved gauge wheel arm adjustment device for an agricultural implement.

It is another object to provide an improved gauge wheel arm adjustment device which permits continuous adjustment of the wheel arm. It is a further object to provide such a device which is securable in any of an infinite number of positions by a single bolt and which eliminates need for a large clamping bolts or serrated brackets or washers.

It is still another object of the invention to provide a continuous gauge wheel arm adjustment device which is simpler and more economical to construct than at least many other presently available devices and yet is positively lockable in any desired position with an ordinary bolt. It is another object to provide such a device which utilizes a scissors action between overlapping and relatively angled slots and a securing bolt to achieve both infinite adjustment and positive arm locking.

In accordance with the above objects, a first slotted plate is rigidly secured to the frame of the implement. A gauge wheel arm or similar member is pivotally connected to the frame and carries a second slotted plate for movement adjacent the first slotted plate as the arm rocks. The slots in the two plates are angled with respect to each other so that the overlapping areas of the slots move radially with respect to the pivot as the arm is adjusted. A bolt is inserted into the overlapping area and tightened to secure the plates with respect to each other and thereby fix the arm in the desired location. The angle between the slots is selected so that the edges of the slots contact the securing bolt shank in scissors fashion to thereby increase the securing action provided by the bolt without having to increase the clamping force of the bolt against the plates. A series of slots is provided in one of the plates to extend the range of adjustment without an overly long slot. The multiple slots permit use of a simple, compact bracket for continuous adjustment of the arm over a relatively wide range of angles with respect to the frame.

These and other objects, features and advantages of the present invention will become apparent to those skilled in the art from the description which follows and from the drawings.

DESCRIPTION OF THE PREFERRED EMBODIMENT

Figure 1:
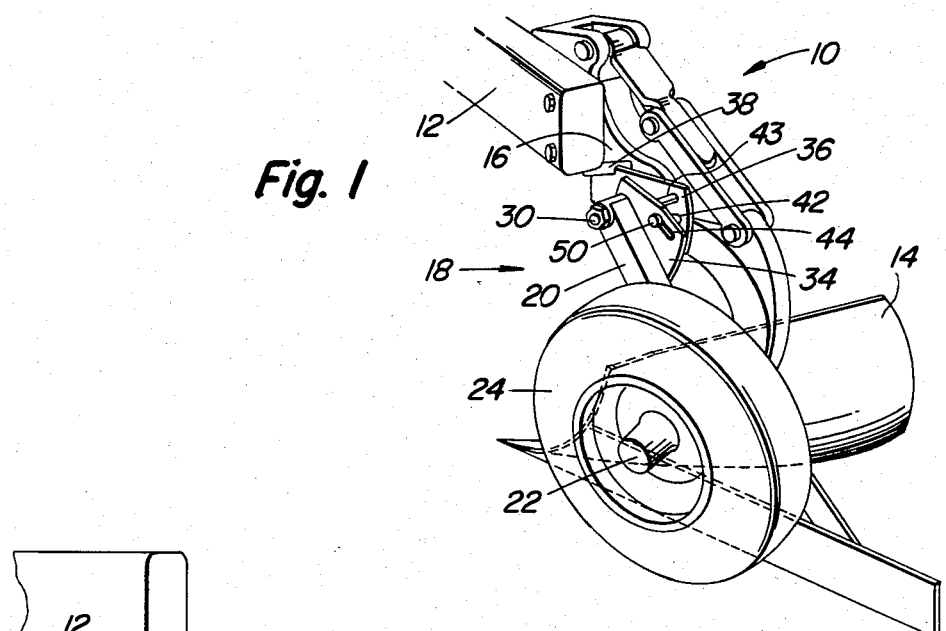
FIG. 1 is a side view of a portion of a plow incorporating the gauge wheel arm adjustment device of the present invention.

Referring now to FIG. 1, a portion of a tillage implement 10 is shown and includes a main frame 12. The implement 10 is shown as a drawn integral plow connected to a tractor (not shown) and includes moldboards 14 connected to the frame 12 by standard brackets 16. The brackets 16 may be shimmed to adjust the width of cut of the moldboards. A gauge wheel assembly 18 is attached to rear standard bracket 16 and includes a gauge wheel arm 20 connected at one end for pivoting with respect to the frame 12 in an upright plane. The opposite end of the arm 20 supports a horizontally disposed transverse axle 22 which mounts a ground-engaging gauge wheel 24. Preferably the gauge wheel 24 is mounted so that it runs parallel to the direction of travel of the plow 10. Attaching the gauge wheel assembly 18 to the rear standard bracket 16 assures that the gauge wheel 24 runs parallel to the direction of travel regardless of how the plow is shimmed to cut.

Figure 2:
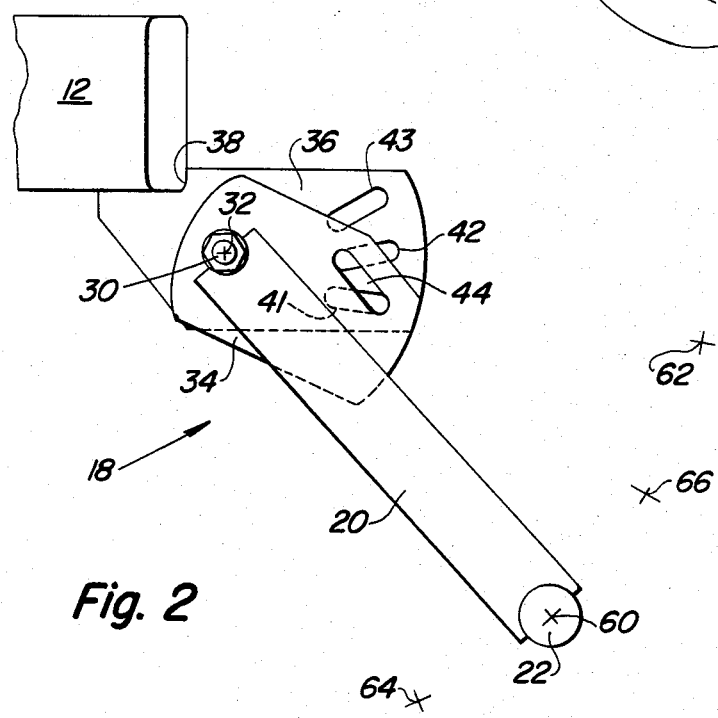
FIG. 2 is an enlarged view of the gauge wheel arm adjustment device of FIG. 1.

The gauge wheel arm 20 is pivotally connected to the standard bracket 16 by a pin 30 for rocking about a transverse axis 32. A slotted plate 34 is welded to the arm 20 for rocking therewith about the axis 32. A second slotted plate 36 is fixed with respect to the frame 12 by an indexing tab 38 and by the pin 30 which passes through the central portion of the plate. In the preferred embodiment, three slots 41, 42 and 43 are provided in the second plate 36, with the inwardmost ends of the slots rounded and centered on an arc of a circle which in turn is centered on the pivotal axis 32 (FIG. 2). The outermost ends of the slots 41, 42 and 43 are also rounded and are centered on an arc of a larger circle which is also centered on the axis 32.

The first and second plates 34 and 36 have abutting faces, and the first plate 34 includes a slot 44 which overlaps a portion of one or two of the slots 41–43 depending on the angle of the arm 20. The longitudinal axis of the slot 44 forms an acute angle with each of the longitudinal axes of the slots 41–43. The length and angle of the slots 41–44 are chosen so that as one end of the slot 44 overlaps the end of one of the slots 41 or 42, the opposite end of the slot 44 just overlaps the end of the next one of the slots 42 or 43, respectively, so that there will be continuous slot overlap over the range of angular adjustment of arm 20 (FIG. 2).

To fix the arm 20 in any angularly adjusted position, a bolt 50 is inserted into the overlapping areas of the slots and is tightened against the plates 34 and 36. The width of the slots 41–44 and the diameter of the bolt 50 are approximately equal so a snug fit is provided between the edges of the slots in the overlapping slot area and the shank of the bolt. The acute angle between the axis of the slot 44 and the axis of the corresponding overlapping one of the slots 41–43 is preferably not greater than about sixty degrees so that as the arm 20 is torqued in either direction from the desired adjusted position, the ramp or scissors action of the edges of the slots against the bolt 50 acts to hold the arm 20 in the adjusted position. Therefore, less clamping force applied by the bolt 50 to the plates 34 and 36 is required to hold the arm 20 in the desired position because of the scissors action of the edges of the slots. The smaller the angle between the overlapping slots, the more directly the opposite slot edge forces will act across the bolt shank to hold the arm 20 in position without relying on the clamping force of the plates 34 and 36 applied by tightening the bolt 50. However, if the angle becomes too small, the length of the slots 41–44 must be increased significantly to achieve a given range of adjustability of the arm 20. A relatively compact plate assembly providing an adequate range of arm angles is achieved utilizing the three slots 41–43 of approximately equal length and the slot 44, angled with respect to the latter no greater than approximately sixty degrees and not less than about forty degrees. The centers of the rounded ends of the slot 44 lie on the same circles which locate the centers of the rounded ends of the slots 41–43, and the distance between the rounded ends of the slot 44 is equal to the distance between the inner end of one of the slots 42 and 43 and the outer end of the adjacent slot 41 or 42. The number and relative angles of the slots are given by way of example only and it is to be understood that these may be varied without departing from the scope of the invention as set forth in the claims below. For example, additional slots may be added to either of the plates 34 or 36 to extend the range of adjustment of the arm 20. Although the arm adjustment device is shown with an adjustable plow, it may be used as well on other implements requiring an adjustable arm.

Referring to FIG. 2, the arm 20 is shown in an intermediate adjusted position indicated at 60 wherein the slot 44 at its radially innermost end overlaps both the innermost end of the slot 42 and the outermost end of the slot 41. The bolt 50 may be inserted through either overlapping area when the arm 20 is in the position shown. The arm 20 may also be adjusted (from position 60) slightly upwardly using the slot 42 with the slot 44, or slightly downwardly using the slot 41 with the slot 44. The configuration of the multiple slots permits continuous, infinitely adjustable arm positioning between an uppermost position 62 and a lowermost position 64. Additional slots in either of the plates 34 or 36 may be provided to increase the range of angles through which the arm 20 may be adjusted.

When the arm 20 is positioned at the desired angle, the bolt 50 is inserted through the overlapping area of the slots and is tightened to urge the plates 34 and 36 together. The friction between the plates and the scissors action of the edges of the slots against the shank of the bolt 50 prevent any relative rocking of the plates, even under heavy shock loading of the arm assembly. Only a single bolt 50 is required to hold the arm 20 in the adjusted position, and need for serrated washers or brackets is eliminated.

Having described the preferred embodiment, it will be apparent that modifications can be made without departing from the scope of the invention as defined in the accompanying claims.

I claim:

1. In a framed implement, a continuously adjustable gauge wheel arm assembly comprising: a gauge wheel arm having a first end pivotally connected for rocking with respect to the implement frame about a pivotal axis, a first plate member connected for rocking with the arm about the axis, a second plate member fixed with respect to the frame parallel and adjacent the first plate member, said plate members including a plurality of elongated slots extending generally radially outwardly from the pivotal axis, said first and second plate members including first and second slots, respectively, having an area of overlapping, said area of overlapping moving radially with respect to the pivotal axis between the ends of one of said slots as the arm is rocked between first and second positions, and securing means including a shank portion extending through the overlapping area of the slots for preventing the plate members from rocking, wherein the axes of the slots form an acute angle with respect to each other so that the edges of the slots in the overlapping area act generally on opposite sides of the shank in scissors fashion and help to prevent relative rocking between the plate members, a gauge wheel connected to the other end of the gauge wheel arm, and wherein at least one of the plate members includes a plurality of slots, said plurality of slots so arranged to provide continuous areas of overlapping between said plurality of slots and the slot in the other of the plate members as the arm is rocked to any position between said first position and a third position beyond said second position.

2. The invention as set forth in claim 1 wherein when the arm is in the second position, said slot in the other of the plates is in an overlapping condition with the radially outermost end of one of the plurality of slots and with the radially innermost end of another of the plurality of slots.

3. The invention as set forth in claim 1 wherein the acute angle is in the range of approximately forty to sixty degrees.

4. The invention as set forth in claim 1 wherein the securing means comprises a single bolt, and the faces of the plate members are urged into contact by said bolt.

5. The invention as set forth in claim 4 wherein the diameter of the shank portion and the width of each of the slots are approximately equal.

6. The invention as set forth in claim 1 wherein the radially innermost ends of said plurality of slots are located on an arc of a circle, said circle centered on the pivotal axis of the arm.

7. The invention as set forth in claim 6 wherein the radially outermost ends of said plurality of slots are located on an arc of a circle of radius greater than said first-mentioned circle, the larger circle also centered on the pivotal axis.

8. The invention as set forth in claim 7 wherein the ends of said slot in the other of said plates are located on the respective circles.

9. The invention as set forth in claim 7 wherein said plurality includes at least three.

10. The invention as set forth in claim 1 wherein the first plate member is secured to the frame by the pivotal connection and includes indexing means cooperating with the frame to prevent relative rotation therebetween about the pivot.

11. The invention as set forth in claim 10 wherein the frame supports an adjustable plow standard bracket, and the gauge wheel arm and first plate member are connected to the standard bracket.

* * * * *